(12) United States Patent
Beck

(10) Patent No.: US 9,009,508 B2
(45) Date of Patent: Apr. 14, 2015

(54) MECHANISM FOR REDUCING INTERRUPT LATENCY AND POWER CONSUMPTION USING HETEROGENEOUS CORES

(75) Inventor: Noah B. Beck, Princeton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 244 days.

(21) Appl. No.: 13/596,390

(22) Filed: Aug. 28, 2012

(65) Prior Publication Data

US 2014/0068289 A1 Mar. 6, 2014

(51) Int. Cl.
*G06F 1/32* (2006.01)
*G06F 9/48* (2006.01)

(52) U.S. Cl.
CPC ............ *G06F 1/3203* (2013.01); *G06F 1/3293* (2013.01); *G06F 9/4812* (2013.01); *Y02B 60/121* (2013.01); *Y02B 60/144* (2013.01)

(58) Field of Classification Search
CPC .................................................. G06F 1/3293
USPC ......................................... 713/320, 323, 324
See application file for complete search history.

(56) References Cited

U.S. PATENT DOCUMENTS

| 6,240,521 | B1 * | 5/2001 | Barber et al. .................. | 713/323 |
|---|---|---|---|---|
| 6,631,474 | B1 * | 10/2003 | Cai et al. ........................ | 713/300 |
| 6,718,475 | B2 * | 4/2004 | Cai ................................. | 713/323 |
| 7,568,115 | B2 * | 7/2009 | Borkar et al. .................. | 713/300 |
| 8,214,675 | B2 * | 7/2012 | Challener et al. ............. | 713/324 |
| 8,484,488 | B2 * | 7/2013 | Belmont et al. ............... | 713/300 |
| 2004/0003309 | A1 | 1/2004 | Cai et al. | |
| 2007/0245164 | A1 | 10/2007 | Mitarai | |
| 2008/0263324 | A1 * | 10/2008 | Sutardja et al. ................. | 712/43 |
| 2009/0083554 | A1 * | 3/2009 | Belmont et al. ............... | 713/300 |
| 2009/0165014 | A1 * | 6/2009 | Park ............................... | 718/105 |
| 2009/0172423 | A1 | 7/2009 | Song et al. | |
| 2009/0222654 | A1 * | 9/2009 | Hum et al. ..................... | 713/100 |
| 2010/0185886 | A1 * | 7/2010 | Mitarai .......................... | 713/323 |
| 2012/0054750 | A1 | 3/2012 | Saripalli | |
| 2013/0346771 | A1 * | 12/2013 | Boom et al. ................... | 713/320 |
| 2014/0026146 | A1 * | 1/2014 | Jahagirdar et al. ............ | 718/105 |

FOREIGN PATENT DOCUMENTS

WO 2013036222 A1 3/2013

OTHER PUBLICATIONS

Shimpi, Anand Lal, "Kal-El Has Five Cores, Not Four: NVIDIA Reveals the Companion Core," Sep. 20, 2011, AnandTech, http://www.anandtech.com/print/4840, 4 pages.
Wikipedia, "Bulldozer (microarchitecture)," downloaded Aug. 28, 2012, http://en.wikipedia.org/wiki/Bulldozer_(microarchitecture), 6 pages.
International Search Report dated Feb. 6, 2014 for Application No. PCT/US2013/056600, 9 pages.

* cited by examiner

*Primary Examiner* — Vincent Tran
(74) *Attorney, Agent, or Firm* — Abel Law Group, LLP

(57) ABSTRACT

A technique for operating a processor includes detecting an interrupt having a first core of the processor as a destination core. The technique includes handling the interrupt by a second core of the processor in response to the first core being in a low-power state. The first core may be capable of executing a greater number of instructions-per-cycle than the second core and the second core may consume less power than the first core. The first core may be coupled to a first voltage plane and the second core may be coupled to a second voltage plane having lower power than the first voltage plane.

14 Claims, 4 Drawing Sheets

MECHANISM FOR REDUCING INTERRUPT LATENCY AND POWER CONSUMPTION USING HETEROGENEOUS CORES

BACKGROUND

1. Field of the Invention

This invention relates to processor systems and more particularly to interrupt processing and power management in processor systems.

2. Description of the Related Art

In general, an interrupt or exception is an event that changes instruction execution from a currently executing instruction flow to another instruction flow. An interrupt is typically generated by a processor or a device coupled to the processor. A typical interrupt processing mechanism changes program control flow of the interrupted processor to an interrupt handler.

Referring to FIG. 1, an exemplary processor system (e.g., system 100) includes at least one processor core (e.g., a central processing unit, core, a graphics processing unit or other processor that may include one or more cores, e.g., cores 102, 104, 106, and 108) configured to execute application threads. An exemplary interrupt delivery mechanism (e.g., an interrupt delivery mechanism of the x86 architecture) includes an interrupt controller (e.g., a local Advanced Programmable Interrupt Controller (APIC)) for each core in the system. In addition, an interrupt controller (e.g., I/O APIC 120) may be included for each peripheral bus in the system. A dedicated bus or a system bus (e.g., crossbar 116) may be used to communicate between APICs. In general, a local APIC (e.g., APIC 103, 105, 107, or 109) manages external interrupts for a corresponding core (e.g., core 102, 104, 106, or 108, respectively). A local APIC may be coupled to the same power plane as the system bus or a separate power plane. A typical local APIC supports a set of usable interrupt vectors, which correspond to interrupt priority and respective interrupt service routines. Another set of interrupt vectors is reserved for interrupt processing by the associated core.

Referring to FIGS. 1 and 2, an inter-processor interrupt is generated by a core (e.g., core 102) that writes to the Interrupt Control Register (ICR) in a corresponding local APIC (e.g., local APIC 103) (202). An ICR includes fields for a destination identifier, delivery mode, an interrupt vector, and other suitable information. Local APIC 103 generates an interrupt message and broadcasts the interrupt message through the on-chip network using crossbar 116 (204). A local APIC (e.g., local APIC 109) that receives the interrupt message determines whether to accept the interrupt based on a state of the associated core (e.g., core 108) and a state of the receiving local APIC itself (e.g., a delivery mode and a destination identifier). For example, if local APIC 109 has an identifier, physical ID, or logical ID that matches the destination ID according to the delivery mode, the local APIC 109 accepts the interrupt message, reads an interrupt vector number from the interrupt message, and a corresponding bit is set in an Interrupt Request Register (IRR) (not shown). Local APIC 109 sends an ACK (acknowledgement) message to local APIC 103 that originated the interrupt message to confirm the acceptance of the interrupt message by local APIC 109 (206).

An interrupt vector number read by an originating local APIC from the interrupt message represents a priority of the interrupt, which is compared to a priority of other pending interrupts and a priority of one or more currently executing threads. If the interrupt has the highest priority, the interrupt is delivered to a destination core. Logic in the originating APIC sends a message to the destination core (208). Receiving the message, the destination core detects the interrupt and at an instruction boundary of a currently executing application thread, the core executes an interrupt service routine. The interrupt service routine and program control is transferred to the interrupt handler, the destination core handles the interrupt by executing actions specified in the interrupt handler (212). Control returns from the interrupt handler and may return to a previously executing application thread, according to results of those actions specified by the interrupt handler (214).

Still referring to FIGS. 1 and 2, an interrupt from a device (e.g., device 122) coupled to a peripheral bus of system 100 is handled similarly to inter-processor interrupts, as described above. For example, in a network packet processing system, device 122 is a network interface card (NIC). When packets arrive, the NIC sends an interrupt to the processor to notify the processor of the arrival of the packets. Device 122 generates an interrupt by asserting an interrupt signal (202) and I/O APIC 120 generates an interrupt message with information, e.g., destination identifier, delivery mode, interrupt vector, or other suitable information. Then, the interrupt is broadcast to the local APICs (204). A destination local APIC sends an acknowledgement to the I/O APIC (206). The interrupt is delivered to the destination core corresponding to the destination local APIC. The destination core processes the interrupt (210, 212, 214) in the same way that a destination core processes inter-processor interrupts. A destination local APIC processes other sources of interrupts in a similar manner, e.g., timer interrupts, performance monitor counter interrupts, or interrupts from thermal sensors.

Processor power management techniques include configuring cores to enter low-power states during idle periods. For example, a low-power state may include supplying a lower voltage to a core power plane, disconnecting a core from its power plane, or a power supply turning off the core power plane entirely. If a destination core is in a low-power state, processor 100 may need to bring the destination core out of the low-power state in order to service an interrupt. Transitioning from the low-power state to a target power state sufficient to handle the interrupt typically increases interrupt service latency as a result of delays associated with ramping up the core power supply to a target voltage level and/or initializing or loading the architectural state of the core. In general, an increase in interrupt service latency decreases the performance of processor 100 and may decrease the quality of a user experience. As a result, processors designed to allow cores to enter low-power states during idle periods must also be able to bring cores out of the low-power states quickly in order to sufficiently service an interrupt destined for one of those cores. This rapid low-power-state exit has a high power cost and may not have sufficiently low interrupt service latency. Accordingly, techniques that reduce interrupt latency associated with power management techniques are desired.

SUMMARY OF EMBODIMENTS OF THE INVENTION

In at least one embodiment of the invention, a method of operating a processor includes detecting an interrupt having a first core of the processor as a destination core. The method includes handling the interrupt by a second core of the processor in response to the first core being in a low-power state. The first core may have different characteristics than the second core. The first core may be capable of executing a greater number of instructions-per-cycle than the second core and the second core may consume less power than the first core. The first core may be coupled to a first voltage plane and the second core may be coupled to a second voltage plane having lower power than the first voltage plane. Handling the interrupt by the second core may include loading the second core with stored state information associated with a first state of the first core and executing instructions initiated by an interrupt handler associated with the interrupt on the second core using the stored state information.

In at least one embodiment of the invention, a processor includes a first core, a second core, and a controller configured to trigger execution of instructions initiated by an interrupt handler on the second core in response to detecting an interrupt having the first core as a destination core and further in response to the first core being in a low-power state. The controller may be further configured to increase the power state of the first core to a target power state and transfer instruction execution from the second core to the first core in response to the first core reaching the target power state. The controller may be further configured to pause instruction execution by the second core in response to encountering an instruction incompatible with the second core and to wait for the first core to reach the target power state. The controller may be further configured to halt instruction execution on the second core, update the stored state information according to a second state of the second core after halting execution of the interrupt handler, and resume instruction execution on the first core using the stored state information after updating the stored state information.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
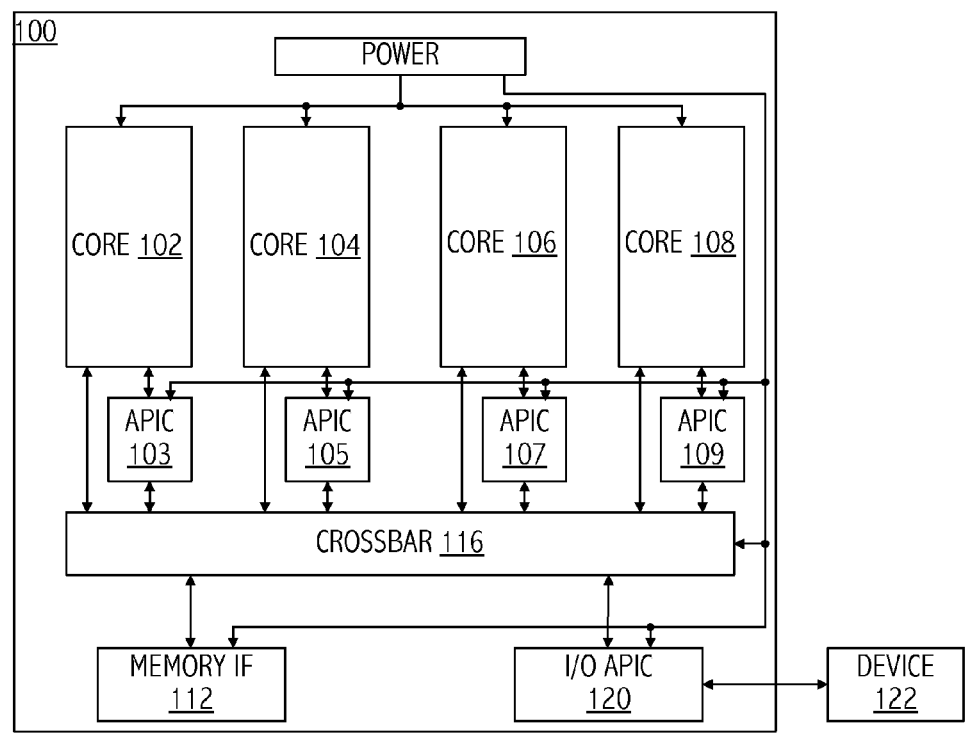
FIG. 1 illustrates a functional block diagram of an exemplary processor system.
Figure 2:
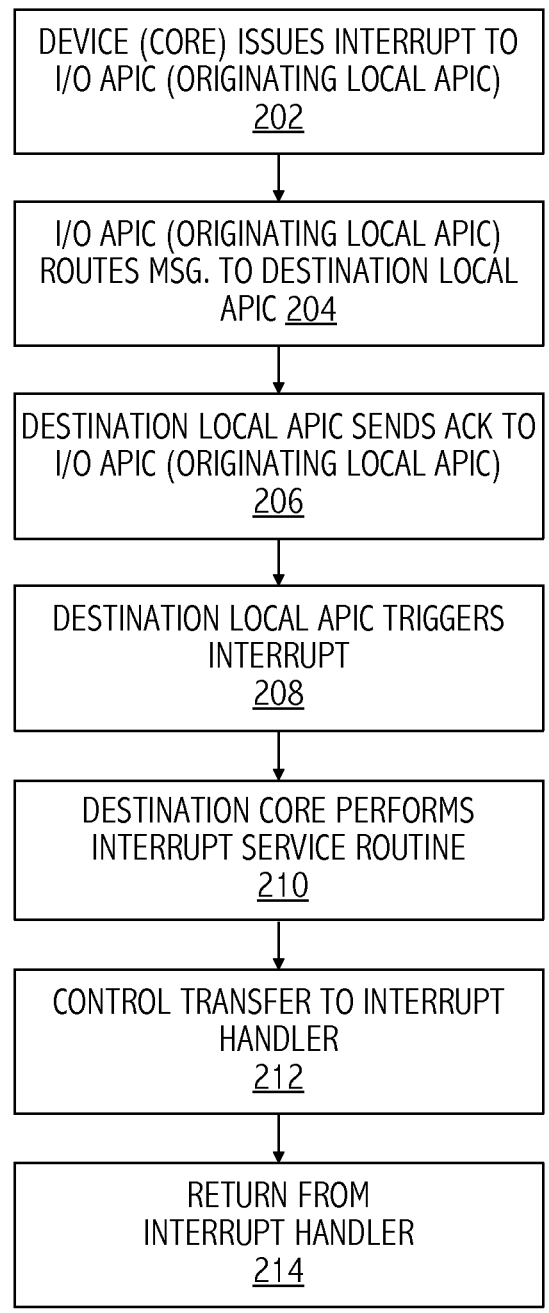
FIG. 2 illustrates exemplary information and control flows for processing interrupts on the processor system of FIG. 1.
Figure 3:
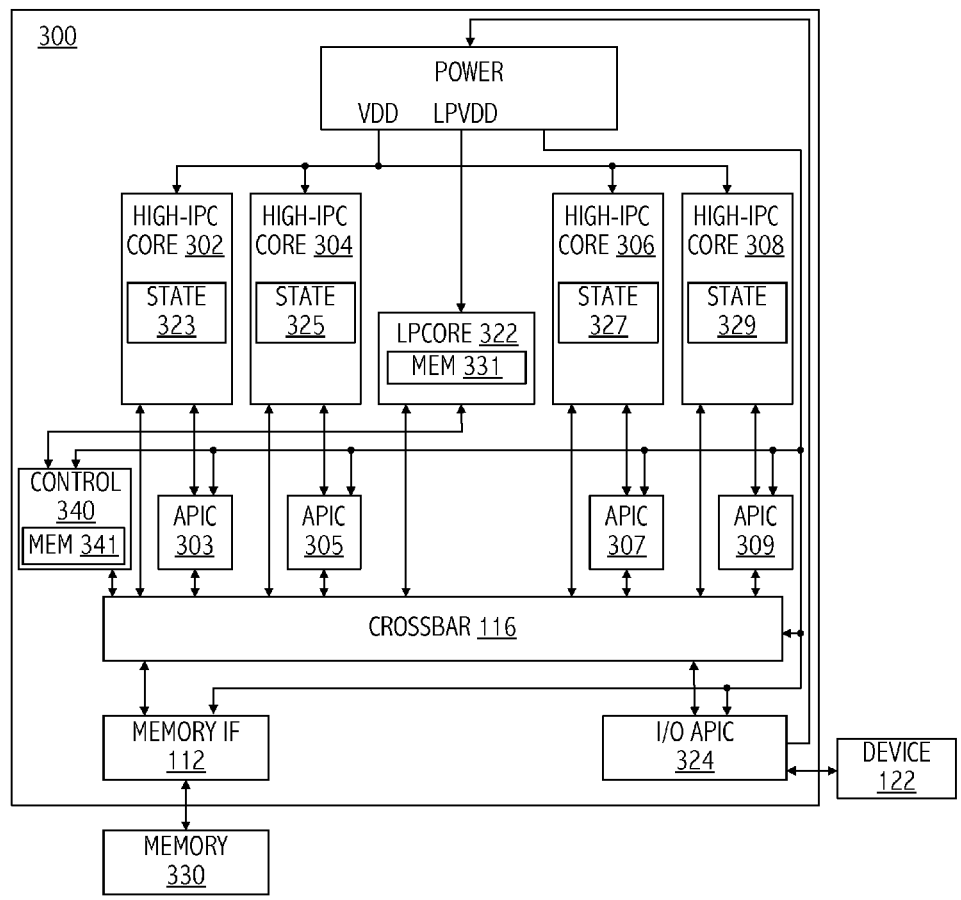
FIG. 3 illustrates a functional block diagram of a processor system consistent with at least one embodiment of the invention.

In general, a processor that has high instructions-per-cycle (IPC) throughput includes at least one processor core that has high-IPC and consumes a substantial amount of integrated circuit die area. A high-IPC processor core requires significant time and power to transition to a target power state from a low-power or powered-down state. Referring to FIG. 3, processor 300 contains heterogeneous cores, i.e., at least one high-IPC core (e.g., high-IPC cores 302, 304, 306, and 308) and at least one low-power core (e.g., LPCORE 322) having a smaller die area and lower power consumption than the high-IPC core. A local APIC corresponding to each high-IPC core is coupled to the high-IPC core and to the system bus. For example, APICs 303, 305, 307, and 309, are coupled to crossbar 116 and are coupled to high-IPC cores 302, 304, 306, and 308, respectively. In at least one embodiment of processor 300, the high-IPC cores receive power from a first power plane, VDD, and the low-power core receives power from a lower-voltage power plane, LPVDD. The low-power core may have a power-up latency that is shorter than the power-up latency of the high-IPC core. The low-power core may always be powered up for execution or the low-power core may be powered up only when a high-IPC core is powered down. The low-power core may be configured to execute any instruction that a high-IPC core can execute with the same architectural result. However, in other embodiments, the low-power core is configured to execute a subset of the instructions supported by a high-IPC core and can detect instructions that it cannot execute. In such embodiments, upon detecting instructions incompatible with the LPCORE 322, LPCORE 322 transfers execution to a high-IPC core. In at least one embodiment, the low-power core implements a different instruction set architecture (ISA) than a high-IPC core and executes binary translation software/firmware or other software/firmware that facilitates emulating the ISA of a high-IPC core, wholly or partially. For example, a processor includes an Advanced Reduced Instruction Set Computer (RISC) Machine (ARM) ISA core running binary translation software as the low-power core and x86 ISA cores as the high-IPC cores.

Processor 300 implements heterogeneous core control functionality that may configure processor 300 to execute code on a low-power core instead of on a high-IPC core. The heterogeneous core control functionality may be embodied in heterogeneous core controller 340, which may be a separate controller module of processor 300 or is included in one or more other modules of processor 300, e.g., in an APIC, in one or more high-IPC cores, which may include software or firmware executing on the one or more high-IPC cores, and/or in other modules of processor 300. Heterogeneous core controller 340 may be coupled to its own power plane or the same power plane as crossbar 116 and local APICs. Heterogeneous core controller 340 may be coupled to APICs directly or may communicate with APICs indirectly using crossbar 116. Although embodiments of processor 300 exclude a separate heterogeneous core controller 340 and implement the heterogeneous core control functionality in one or more modules of processor 300, note that the heterogeneous core control functionality is still referred to herein as heterogeneous core controller 340. Heterogeneous core controller 340 may configure processor 300 to execute code on a low-power core instead of on a high-IPC core by making accessible to the low-power core the architectural state of the high-IPC core in one or more storage elements. For example, the architectural states of high-IPC cores 302, 304, 306, and 308, which are stored in register locations or other storage elements of the corresponding cores (e.g., in state elements 323, 325, 327, and 329, respectively) is written to common storage location accessible by LPCORE 322, e.g., stored in memory 341 associated with heterogeneous core controller 340 or stored in memory 330 via memory interface 112.

A processor 300 may have one of multiple different heterogeneous core configurations having different numbers of high-IPC cores and low-power cores. For example, processor 300 may include one or more low-power cores that are used to service an interrupt destined for a particular subset of the high-IPC cores. In another embodiment, processor 300 includes one or more low-power cores that are used to service an interrupt destined for any high-IPC core. A processor 300 may maintain at least one low-power core powered up for executing instructions while one or more of the high-IPC cores are configured to be in a low-power state. In at least one embodiment of a processor, a low-power core may be configured to be in a low-power state (e.g., a core C6 state in an AMD A-series processor, or any other low-power state that has made the core architectural state available for use by a low-power core) during idle intervals. In at least one embodiment of processor 300, system software (e.g., an operating system, a hypervisor, or other similar software) that executes on a high-IPC core may or may not be allowed to schedule independent instruction streams on the low-power core(s) present in the processor. In embodiments of a processor that include a low-power core that is visible to the system software, a corresponding local APIC may be included for each low-power core.

Figure 4:
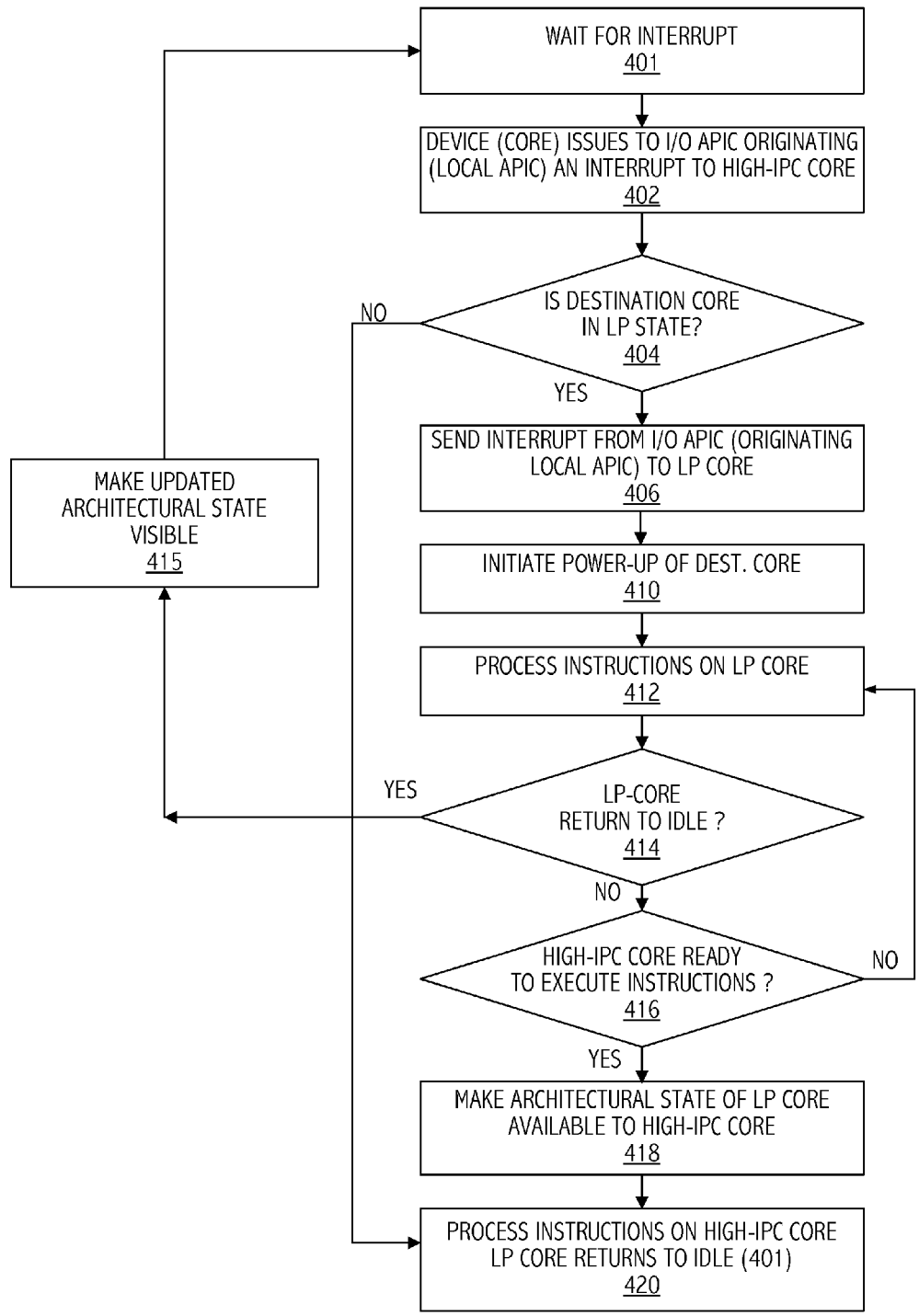
FIG. 4 illustrates information and control flows for processing interrupts on a processor system using a mechanism consistent with at least one embodiment of the invention.

Referring to FIGS. 3 and 4, in at least one embodiment, heterogeneous core controller 340 waits for an interrupt (401). When heterogeneous core controller 340 detects an interrupt (e.g., device 122 issues an interrupt to I/O APIC 324 or a core issues an interrupt to its corresponding local APIC) (402), heterogeneous core controller 340 determines whether the destination high-IPC core (e.g., a destination core determined by software executing on a processor 300) is in a low-power state (404). If a destination high-IPC core is in a low-power state, heterogeneous core controller 340 sends the interrupt message to a low-power core that is powered-up for interrupt handling (406). For example, heterogeneous core controller 340 may change the destination of the interrupt message to identify a low-power core as the destination. Heterogeneous core controller 340 may power up the low-power core if the low-power core is not already in a suitable power state. In addition, heterogeneous core controller 340 may unconditionally power up the destination high-IPC core or may power up the destination high-IPC core based on a type of the interrupt (410). For example, if the interrupt is associated with a short interrupt service routine that may be completely executed by the low-power core, heterogeneous core controller 340 may not power up the destination high-IPC core and the interrupt is handled completely using the low-power core. However, if the interrupt is associated with a relatively long or complex interrupt routine that would benefit from or require partial execution on the destination high-IPC core, or if the interrupt handler provides a signal to the system software that a program thread is ready to run, heterogeneous core controller 340 may power up the destination high-IPC core, while the low-power core begins to execute instructions associated with the interrupt handler (412). Once the high-IPC core reaches a target power state and is ready to execute code, the high-IPC core indicates to the heterogeneous core controller 340 that it is ready to execute the remainder of the instructions. Then, the low-power core pauses instruction execution and makes its architectural state available to the high-IPC core. Heterogeneous core controller 340 may transfer the core architectural state from the low-power core to the high-IPC core, which resumes instruction execution.

An interrupt service routine or other set of instructions may benefit from partial execution on the destination high-IPC core if the speedup of partial execution on the destination high-IPC core exceeds any latency penalty associated with switching execution from the low-power core to the high-IPC core. An interrupt handler or other set of instructions may benefit from partial execution on the destination high-IPC core if the low-power core is unable to complete execution of the interrupt service routine because it does not support particular instructions of the high-IPC core. For example, the low-power cores may not implement the full instruction set that is implemented by the high-IPC cores. The low-power cores may implement a subset of instructions that are commonly found in operating system or hypervisor interrupt handlers, or the subset of instructions includes only instructions that are commonly found near the beginning of interrupt service routines. Implementing only this subset of instructions may still decrease the latency of servicing an interrupt as compared to a system requiring the high-IPC core to be at a target power state before starting an interrupt service routine.

In at least one embodiment, heterogeneous core controller 340 begins to power up the high-IPC core while the low-power core executes instructions initiated by the interrupt handler (412). If the low-power core is returned to the idle state by system software after completing the interrupt service routine before receiving an indication that the high-IPC core is ready (414), then the low-power core will save its architectural state so that it is available for later execution of instructions (e.g., an interrupt service routine or other routine) by the low-power core or high-IPC core (415). If the low-power core does not return to an idle state (415) and does not receive an indication that the high-IPC core is ready (416), then the low-power core continues to process instructions (412). If the low-power core does not return to an idle state (415) and receives an indication that the high-IPC core is ready (416), then the low-power core will make its architectural state available to the high-IPC core (418). The low-power core may indicate to the high-IPC core whether the state information should be read from the low-power core (e.g. by reading memory-mapped registers of the low-power core in memory 331, or by other suitable technique) or from another location available to the high-IPC core. Then, the high-IPC core will update its architectural state and resume execution of instructions (420). Meanwhile, the low-power core may return to an idle state. If the high-IPC core completes execution of the instructions, prior to entering an idle state and/or low-power state again, the high-IPC core makes its architectural state visible to other cores. Note that information and control flows of FIG. 4 are exemplary only and other embodiments of a processor consistent with the techniques described herein may perform tasks in other orders that maintain the integrity of any data dependencies.

In some embodiments, processor 300 applies heuristics to determine how long to execute instructions initiated by an interrupt service routine on the low-power core before starting to power up the high-IPC core. If the low-power core is allowed to execute long enough, it may reach the end of the interrupt service routine and be placed into an idle state by system software, and there is no need to power up the high-IPC core. Accordingly, the low-power core makes its final architectural state available for later instruction execution by the low-power core or the high-IPC core, e.g., by writing the architectural state to storage locations used to provide the architectural state of the high-IPC to the low-power core. If the low-power core does not implement an instruction encountered in the execution path, then the low-power core may indicate to the processor that it is waiting for the high-IPC core to be ready to execute instructions in order to increase the urgency of preparing the high-IPC core to execute instructions.

In at least one embodiment of processor 300, the low-power cores themselves may be able to enter a low-power state, but have a lesser latency and power cost as compared to a high-IPC core for transitioning to a powered-up state. The low-power cores can be on the same power plane as the high-IPC cores (VDD) or on a different power plane (LPVDD) from the high-IPC cores. In an embodiment, the low-power core is coupled to a power plane that is powered on when the I/O bus and the memory bus are both powered, although the high-IPC cores are powered off during low I/O activity.

The techniques disclosed herein may reduce power consumption during processor execution by using less power for workloads that consist of running frequent short interrupt routines since high-IPC cores may not need to be powered up at all in such workloads. Such workloads also may see a reduction in interrupt latency since interrupt handler execution does not need to wait for high-IPC cores to be powered up. Furthermore, techniques disclosed herein allow a high-IPC core to be powered up more slowly, which permits the use of a power supply for the high-IPC cores that supports lower instantaneous current levels. Thus, techniques have been described herein that reduce processor interrupt latency and/or reduce power consumption in a processor system.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which multiple high-IPC cores and one low-power core are included in processor 300, one of skill in the art will appreciate that the teachings herein can be utilized with processors having different numbers of high-IPC cores and low-power cores. In addition, note that while the invention has been described in embodiments that use APIC circuitry, those functions may be performed by other modules of a processor. Variations and modifications of the embodiments disclosed herein, may be made based on the description set forth herein, without departing from the scope and spirit of the invention as set forth in the following claims.

What is claimed is:

1. A method of operating a processor comprising:
    detecting an interrupt having a first core of the processor as a destination core; and
    handling the interrupt by a second core of the processor in response to the first core being in a low-power state, wherein handling the interrupt by the second core comprises:
        loading the second core with stored state information associated with a first state of the first core; and
        executing instructions initiated by an interrupt handler associated with the interrupt on the second core using the stored state information;
    increasing the power state of the first core to a target power state; and
    transferring instruction execution from the second core to the first core in response to the first core reaching the target power state, wherein transferring execution comprises:
        halting instruction execution on the second core;
        updating the stored state information according to a second state of the second core after halting instruction execution; and
        resuming instruction execution on the first core using the stored state information after updating the stored state information.

2. The method, as recited in claim 1, wherein the first and second cores have differing characteristics.

3. The method, as recited in claim 1, wherein the first core is capable of executing a greater number of instructions-per-cycle than the second core and the second core consumes less power than the first core.

4. The method, as recited in claim 1, wherein the first core is coupled to a first voltage plane and the second core is coupled to a second voltage plane having lower power than the first voltage plane.

5. The method, as recited in claim 1, wherein system software is configured to schedule instructions to the first core and not the second core.

6. The method, as recited in claim 1, further comprising:
    pausing instruction execution by the second core in response to encountering an instruction incompatible with the second core; and
    waiting for the first core to reach the target power state.

7. The method, as recited in claim 1, wherein the executing instructions includes fully executing the interrupt handler on the second core and subsequently being placed into an idle state by system software, the method further comprising:
    updating the stored state information according to a second state of the second core after execution of the instructions.

8. A method of operating a processor comprising:
    detecting an interrupt having a first core of the processor as a destination core; and
    handling the interrupt by a second core of the processor in response to the first core being in a low-power state, wherein handling the interrupt by the second core comprises:
        loading the second core with stored state information associated with a first state of the first core; and
        executing instructions initiated by an interrupt handler associated with the interrupt on the second core using the stored state information;
    increasing the power state of the first core to a target power state; and
    transferring instruction execution from the second core to the first core in response to the first core reaching the target power state, wherein transferring execution comprises:
        halting instruction execution on the second core;
        indicating to the first core that state information should be read directly from the second core; and
        resuming instruction execution on the first core upon updating the state of the first core with the state information from the second core.

9. A processor comprising:
    a first core; and
    a second core; and
    a controller configured to trigger execution of instructions initiated by an interrupt handler on the second core in response to detecting an interrupt having the first core as a destination core and further in response to the first core being in a low-power state,
    wherein the controller is further configured to increase the power state of the first core to a target power state and transfer instruction execution from the second core to the first core in response to the first core reaching the target power state,
    wherein the controller is further configured to halt instruction execution on the second core, update the stored state information according to a second state of the second core after halting instruction execution, and resume instruction execution on the first core using the stored state information after updating the stored state information.

10. The processor, as recited in claim 9, wherein the controller is further configured to pause instruction execution by the second core in response to encountering an instruction incompatible with the second core and to wait for the first core to reach the target power state.

11. The processor, as recited in claim 9, wherein the first core is capable of executing a greater number of instructions-per-cycle than the second core and the second core consumes less power than the first core.

12. The processor, as recited in claim 9, further comprising:
a storage module storing system software instructions configured to schedule instructions to the first core and not the second core.

13. The processor, as recited in claim 9, further comprising:
a first voltage plane coupled to the first core; and
a second voltage plane coupled to the second core, the second voltage plane having lower power than the first voltage plane.

14. The processor, as recited in claim 9, further comprising:
a storage module accessible to the first core and the second core and configured to store architectural state information.

* * * * *